United States Patent [19]

Fujita et al.

[11] Patent Number: 4,650,213
[45] Date of Patent: Mar. 17, 1987

[54] VEHICLE BODY INCLINING APPARATUS OF VEHICLE

[75] Inventors: Haruyasu Fujita, Tokyo; Masao Ogawa; Kenji Honma, both of Shiki, all of Japan

[73] Assignee: Honda Giken Kogyo Kabushiki Kaisha, Tokyo, Japan

[21] Appl. No.: 796,335

[22] Filed: Nov. 12, 1985

[30] Foreign Application Priority Data

Nov. 28, 1984 [JP] Japan .................................. 59-249469
Nov. 28, 1984 [JP] Japan .................................. 59-249470
Nov. 28, 1984 [JP] Japan .................................. 59-249471

[51] Int. Cl.⁴ ............................................... B62D 9/02
[52] U.S. Cl. .................................... 280/772; 280/707; 280/112 A
[58] Field of Search .................... 280/772, 95 R, 666, 280/663, 660, 707, 709, 714, 112 A

[56] References Cited

U.S. PATENT DOCUMENTS

| 782,954 | 2/1905 | Elliott | 137/625.24 |
| 1,084,740 | 1/1914 | Holzwarth | 137/625.23 |
| 2,247,749 | 7/1941 | De Venel | 280/707 |
| 2,650,108 | 8/1953 | Bruce | 280/112 A |
| 2,905,430 | 9/1954 | Deist | 280/714 |
| 2,996,309 | 8/1961 | Nallinger | 280/112 A |
| 3,129,644 | 4/1964 | Anderson | 137/625.23 |
| 3,222,867 | 12/1965 | Gauldie | 137/625.24 |
| 3,820,809 | 6/1974 | Blonar | 280/772 |
| 3,820,812 | 6/1974 | Stubbs | 280/709 |
| 4,159,128 | 6/1979 | Blaine | 280/772 |
| 4,345,661 | 8/1982 | Nishikawa | 280/112 A |
| 4,373,743 | 2/1983 | Parsons | 280/772 |

FOREIGN PATENT DOCUMENTS 2097730 11/1982 United Kingdom ................. 280/772

Primary Examiner—Richard A. Bertsch
Attorney, Agent, or Firm—Armstrong, Nikaido, Marmelstein & Kubovcik

[57] ABSTRACT

A steering member for reciprocating in the right and left direction relative to a vehicle body is connected with a tie rod. The steering member is engaged with a lean control member. The lean control member is mounted on the vehicle body for swinging in the right and left direction. The lean control member is mounted with an upper end of a suspension spring. When the steering member is reciprocated in the right and left direction, the lean control member is swung according to the reciprocation of the steering member. According to the foregoing swinging, the suspension spring pushes down or pulls up vehicle wheels relative to the vehicle body. As a result, the vehicle body is inclined toward the turning center side. In this way, a driver can enjoy the same steering sense as that of a motorcycle in an automobile or a motor tricycle.

4 Claims, 14 Drawing Figures

VEHICLE BODY INCLINING APPARATUS OF VEHICLE

BACKGROUND OF THE INVENTION

This invention relates to a vehicle which is equipped with at least one unit of a pair of right and left wheels such as an automobile and a motor tricycle.

In a vehicle having a pair of right and left wheels as set forth above, a vehicle body tends to incline outwardly, i.e., toward the opposite direction with respect to a turning center of the vehicle due to the centrifugal force during turning. On the other hand, in a two-wheel vehicle, it effects a turn by inclining its body inwardly, i.e., in a lean state. The present invention intends to provide a device for causing a vehicle body or vehicle wheels to incline toward the turning center side during turning, so that a driver can enjoy a similar steering sense as that of a two-wheel vehicle in an automobile or motor tricycle.

A motor tricycle which can be inclined toward the turning center side of a vehicle body during turning is described in, for example, Japanese Laid-open Patent Publication (Kokai Tokkyo Koho) No. 54-25033. This motor tricycle has two right and left front wheels and one rear wheel, and it is constructed as such that its body is inclined toward the turning center side during turning by shifting the weight of a driver toward the turning center side resisting the centrifugal force. Since this motor tricycle is of a saddle type as a usual motorcycle is, it is comparatively easy for the driver to shift his weight to incline the vehicle body. However, when a driver's seat is a seat type as a usual automobile, it is not necessarily an easy job for him to incline the vehicle body merely by shifting his weight.

SUMMARY OF THE INVENTION

It is therefore an object of the present invention to provide a vehicle body inclining apparatus, wherein a vehicle body is automatically inclined toward the turning center side by means of steering operation, even if a driver does not intendedly shift his weight during turning irrespective of whether the vehicle is of the aforementioned saddle type or seat type.

Another object of the present invention is to provide a vehicle body inclining apparatus, wherein a vehicle body is automatically inclined toward a turning center side due to steering operation by means of provision of a steering member which is reciprocally movable in the right and left direction and a lean control member which is swingable in association with the movement of the steering member.

A further object of the present invention is to provide a vehicle body inclining apparatus, wherein a relation between an operation angle of a handle and an inclination angle of a vehicle body can be selected so as to have various characteristics of linear type and non-linear type.

A still further object of the present invention is to provide a vehicle body inclining apparatus, wherein the steering member is not acted with a bending stress, and therefore, the steering member can effect a smooth reciprocal movement.

A vehicle body inclining apparatus according to the present invention includes a steering member which effects a reciprocal movement in the right and left direction, a tie rod connected to the steering member, a lean control member mounted on a vehicle body for swinging in the right and left direction and engaged with the steering member, the lean control member being swingable in accordance with the reciprocal movement of the steering member, and a suspension spring mounted to the lean control member.

In this vehicle body inclining apparatus, a linear motion of the steering member is converted to a swinging motion of the lean control member. According to this swinging motion, the suspension spring pushes down or pulls up vehicle wheels relative to a vehicle body. As a result, the vehicle body is inclined toward the turning center side.

The above and other objects and features of the present invention will become apparent from the following description with reference to the accompanying drawings.

DETAILED DESCRIPTION OF THE PREFERRED EMBODIMENTS

FIGS. 1 through 9 illustrate one embodiment of the present invention. In this embodiment, the present invention is applied to a motor tricycle having two front wheels and one rear wheel.

Figure 1:
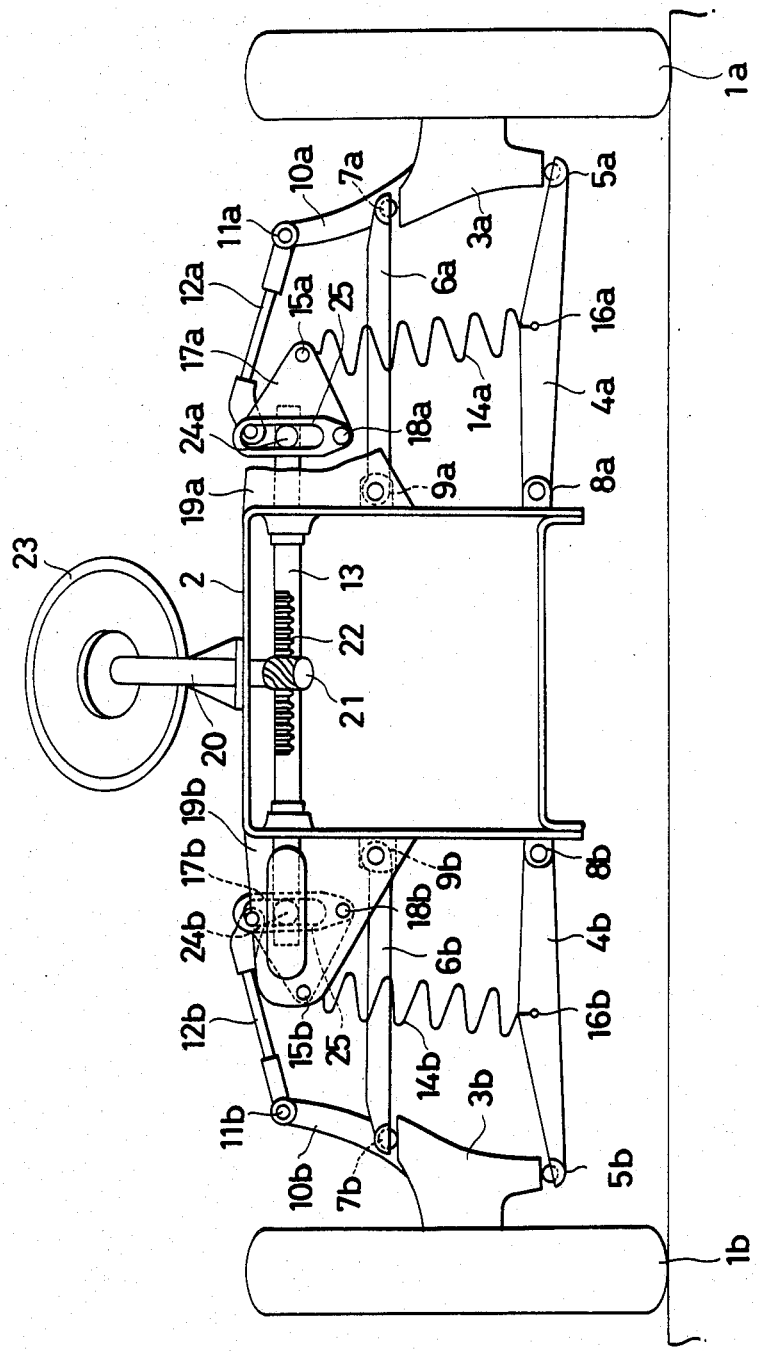
FIG. 1 is a front view of one embodiment of the present invention when running straight forward.
Figure 2:
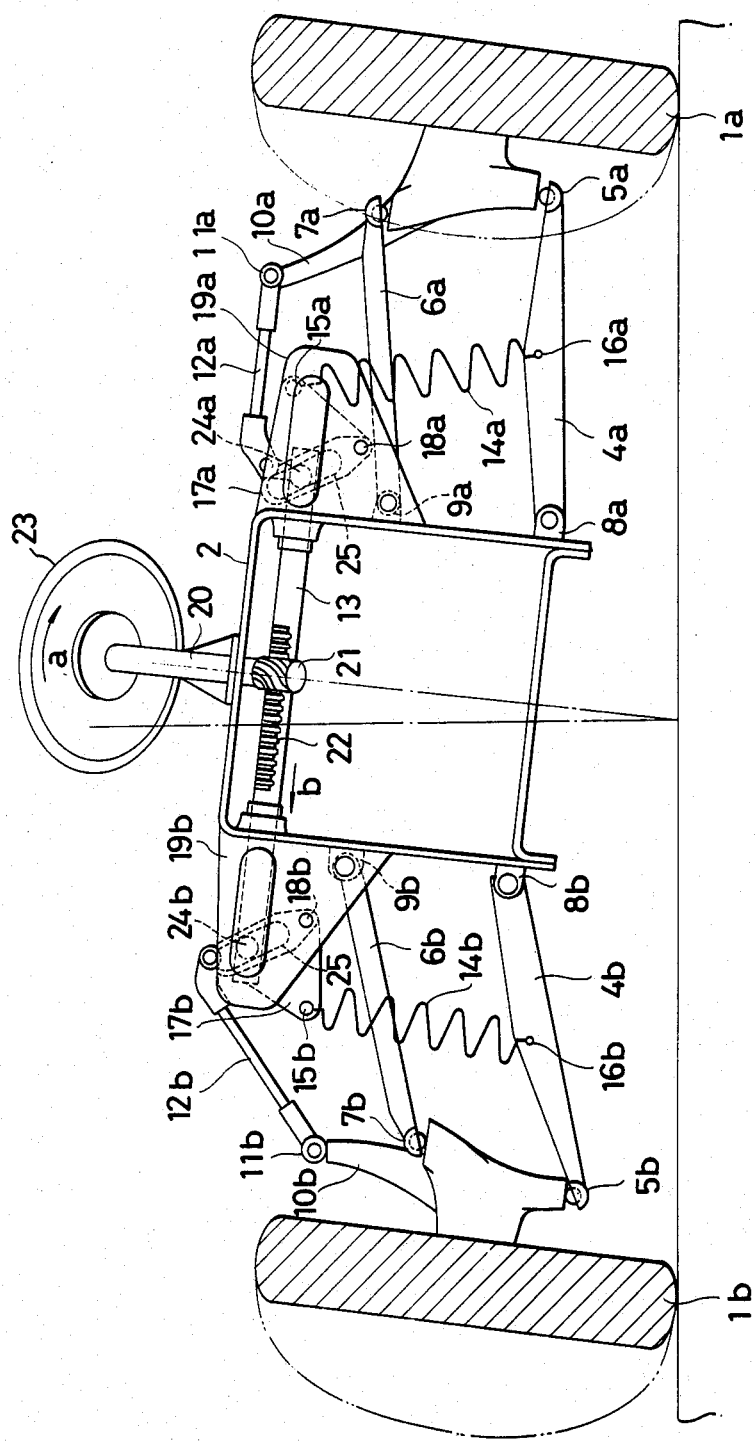
FIG. 2 is a front view of the above embodiment when effecting a turn.
Figure 3:
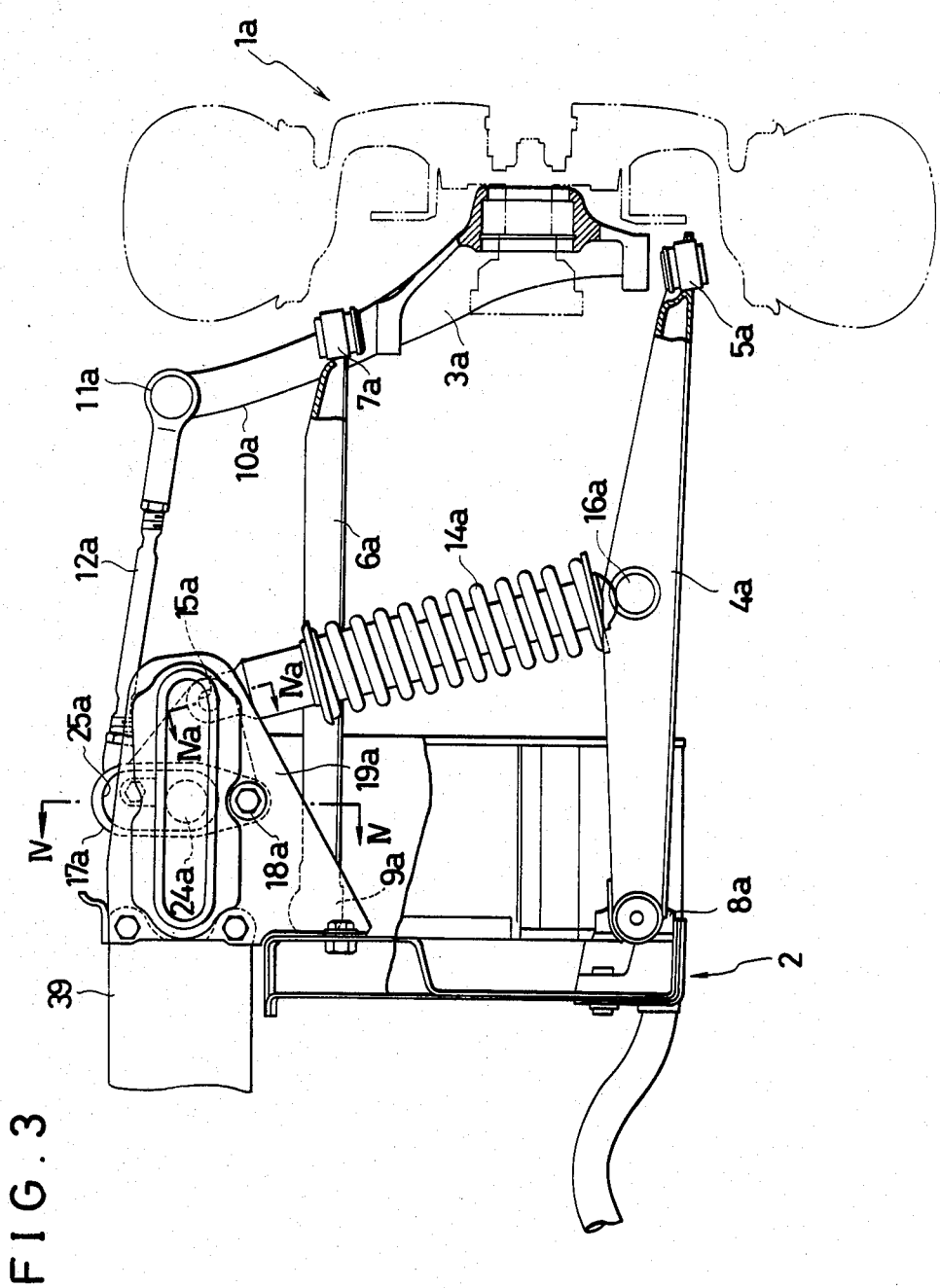
FIG. 3 is an enlarged view of FIG. 1 showing a part thereof in greater detail.

FIG. 1 is a front view of a vehicle body inclining apparatus when viewed from the front at a time when a vehicle is running straight, and FIG. 2 is likewise a front view of the vehicle body inclining apparatus when viewed from the front at a time when the vehicle is effecting a turn. FIG. 3 illustrates more in detail a left side of the vehicle body inclining apparatus at the time when the vehicle is running straight. It should be noted that the terms "left" or "right" when used hereinafter means the left or the right when viewed from a driver. $1a$ denotes a left front wheel, $1b$ denotes a right front wheel, and 2 denotes a vehicle body. The left and right front wheels $1a$ and $1b$ are provided with knuckles $3a$ and $3b$ integrated with an axle, respectively. Connected to lower end portions of these knuckles 3a and 3b through ball joints 5a and 5b are lower arms 4a and 4b. Connected to upper end portions of the knuckles 3a and 3b through ball joints 7a and 7b are upper arms 6a and 6b. The other ends of the lower arms 4a and 4b are pivotally attached to a vehicle body 2 through brackets 8a and 8b. The other ends of the upper arms 6a and 6b are pivotally attached to the vehicle body 2 through brackets 9a and 9b. The foregoing constitutes the so-called wishbone type suspension.

The knuckles 3a and 3b are provided with knuckle arms 10a and 10b projecting backwardly therefrom. Connected to the knuckle arms 10a and 10b through ball joints 11a and 11b are tie rods 12a and 12b. The other ends of the tie rods 12a and 12b are, as will be described in detail, pivotably connected to both end portions of the steering member 13.

14a and 14b denote left and right suspension springs, lower ends of which are mounted to intermediate portions of the lower arms 4a and 4b through pivots 16a and 16b. Upper ends of the suspension springs 14a and 14b are mounted to lean control members 17a and 17b through pivots 15a and 15b, respectively. The lean control members 17a and 17b are pivotably mounted to a bracket 19 fixed to the vehicle body 2 through an oscillation member or pivot shaft 18.

The steering member 13 is a rack rod having a rack 22 meshed with a pinion 21. The member 13 is moved leftwardly or rightwardly by manipulating a steering wheel 23, and causes the front wheels 1 to deflect through the tie rod 12 connected to one end portion thereof as described before. The steering member 13 is provided at its end portions each with an engaging piece 24 comprising a roller projecting therefrom. The engaging piece 24 is slidably engaged in an elongated hole 25 formed in the lean control member 17 in the radial direction, that is, in the direction radiating from the oscillation member 18. In FIGS. 1 and 2, the steering member 13, etc. are shown in a simplified form only for purposes of explaining the functions thereof.

When the vehicle is running straight, the pinion 21 is meshed with the rack 22 at its central position as shown in FIG. 1. However, when it is going to effect a turn, for example, leftwardly, the steering wheel 23 is turned clockwise as shown by an arrow a in FIG. 2. Then, due to the pivotal movement of the pinion 21, the steering member 13 is moved rightwardly as shown by an arrow b, and the lean control member 17 which is engaged with the engaging piece 24 through the elongated hole 25 is swung rightwardly about the pivot shaft 18. Since the suspension springs 14a and 14b are mounted to the lean control members 17a and 17b, each with its upper portion inclined toward the vehicle body side as shown in FIG. 1, when the lean control members 17a and 17b are swung rightwardly as described in the foregoing, the right side suspension spring 14b is acted with a compression. As a result, the spring 14b pushes down the lower arm 4b at the right side relative to the vehicle body, and at the same time, the left side suspension spring 14a is acted with a tension. As a consequence, the spring 14a pulls up the left side lower arm 4a relative to the vehicle body 2. At this time, the upper arms 6a and 6b follow the movement of the lower arms 4a and 4b. However, since the vehicle wheels 1a and 1b always contact the ground, when the respective members are moved as described, the vehicle body 2 is finally inclined, as shown in FIG. 2, leftwardly, that is, toward the turning center side (which causes the front wheels 1a and 1b to incline, too). Thus the motor tricycle effects a turn in a lean state just like a motorcycle. So far, a left turn is described, and a right turn is effected in the same manner.

Figure 4:
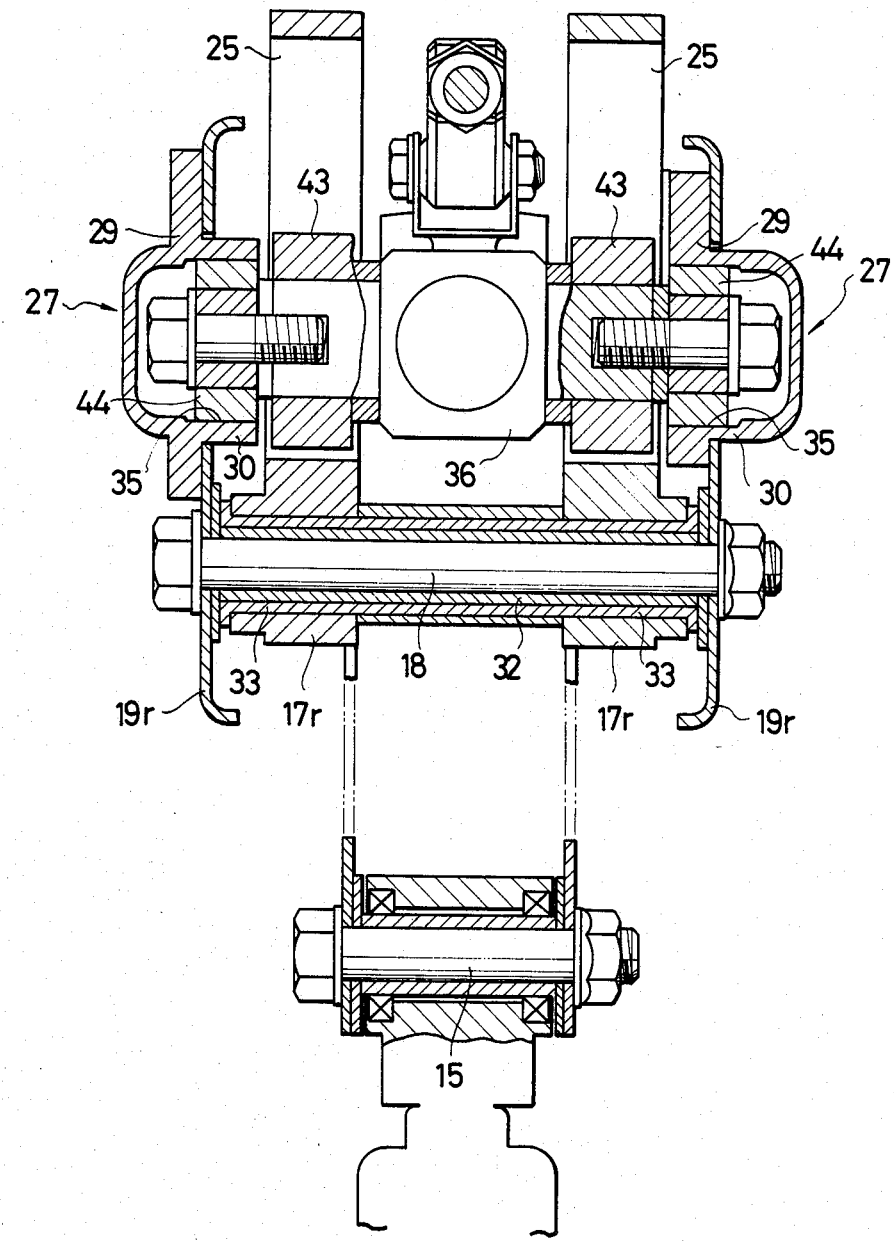
FIG. 4 is a sectional view taken on lines IV—IV and IVa—IVa of FIG. 3.
Figure 5:
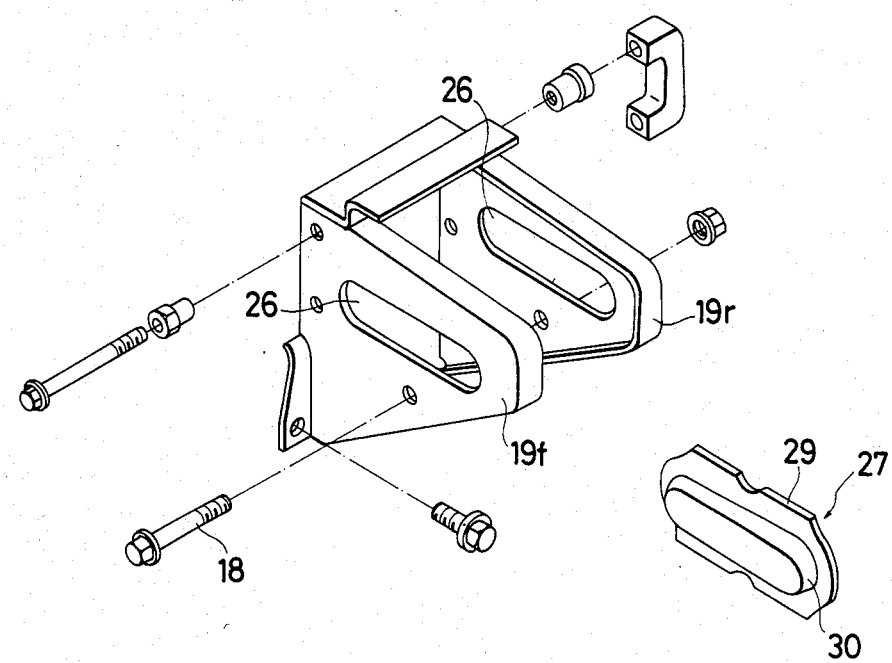
FIG. 5 is an exploded perspective view of a bracket and a rail member.

As shown in FIGS. 4 and 5, the bracket 19 comprises two front and rear bracket pieces 19f and 19r. Each of the bracket pieces 19f and 19r is formed with a hole 26 extending in the right and left direction. Each of these bracket pieces 19f and 19r is fixed with a rail member 27 by suitable means such as welding. These rail members 27 comprise a plate-shaped mounting piece 29 and a rail piece 30 projecting from the mounting piece 29 and forming a guide groove 35 for supporting and guiding a steering member as will be described hereinafter, and are mounted to the bracket 19 by causing the rail piece 30 to engage in the hole 26. Alternatively, the rail member 27 may be integrally formed with the bracket pieces 19f and 19r.

Figure 6:
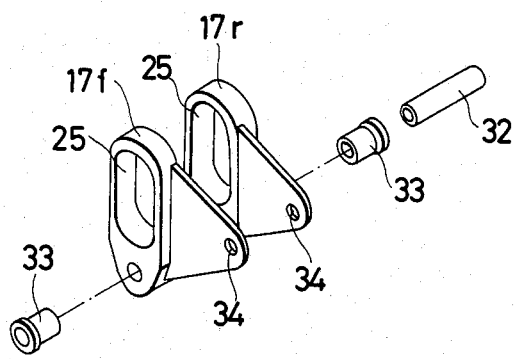
FIG. 6 is an exploded perspective view of a lean control member.

The bracket 19 is further provided between both the bracket pieces 19f and 19r with a bolt 18 which constitutes the afore-mentioned pivot shaft 18. The bolt 18 is pivotally attached with two front and rear lean control members 17f and 17r as shown in FIG. 6 through a collar 32 and a bush 33. Each of the lean control members 17 is formed with the elongated hole 25 in the radial direction and with a pivot hole 34 at a portion extending outside. Between both the lean control members 17f and 17r, a pivot 15 is mounted in such a manner as to be thrusted through the pivot holes 34, 34 (see FIG. 4). This pivot 15 is, as shown in FIGS. 1 and 2, connected with an upper end of the suspension spring 14.

Figure 8:
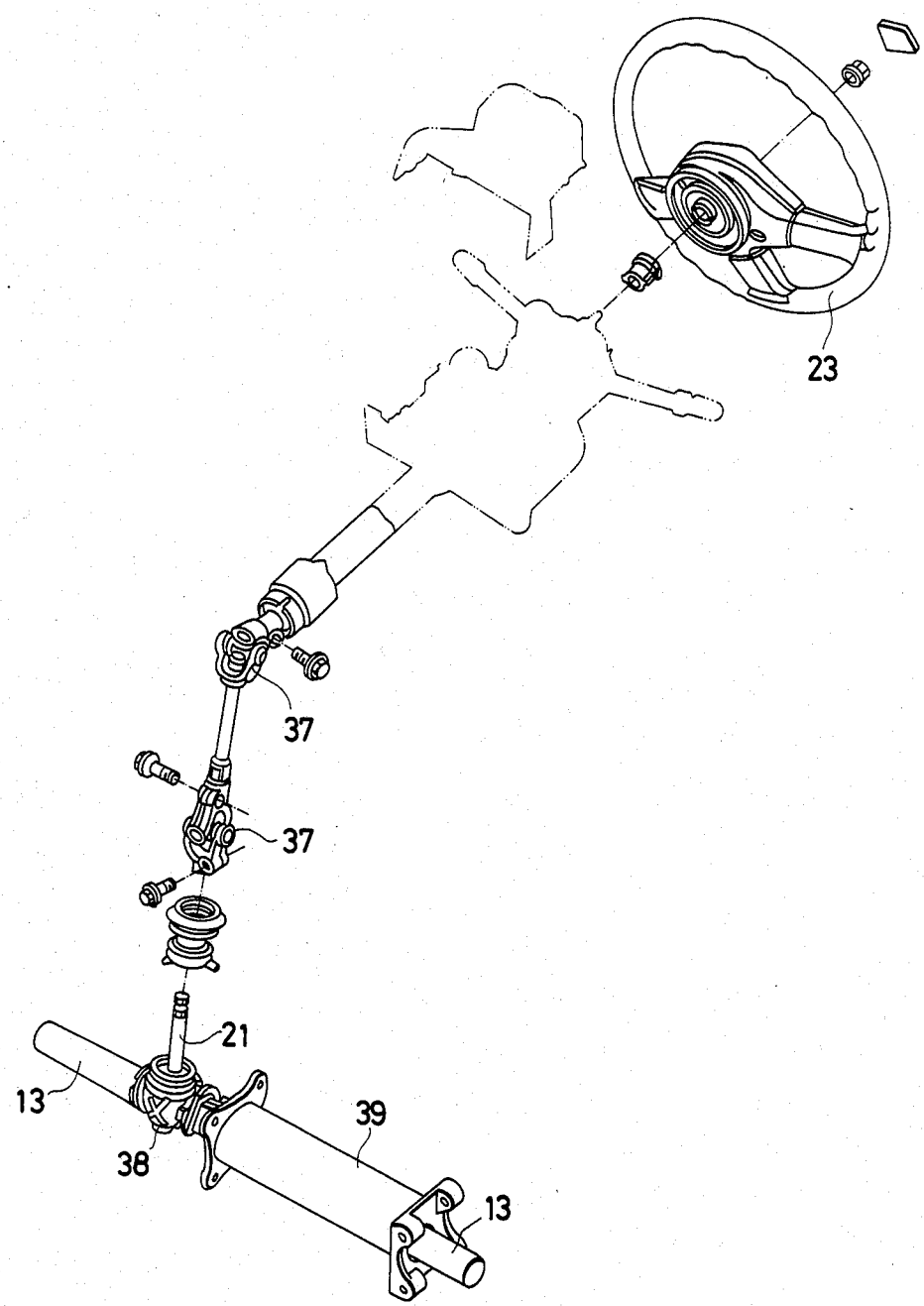
FIG. 8 is an exploded perspective view showing a steering mechanism.

Between both the lean control members 17f and 17r, a rack end 36 fixed to an end portion of the steering member (rack rod) 13 is disposed in such a manner as to be reciprocated in the right and left direction, i.e., the perpendicular direction with respect to paper in FIG. 4, Although the steering mechanism including from the steering wheel 23 to the rack rod 13 is shown in its simplified form in FIGS. 1 and 2, for example, as shown in FIG. 8, the movement of the steering wheel 23 is transmitted to the pinion 21 through universal joints 37, 37. Further, although the pinion 21 is engaged with the rack 22 (FIGS. 1 and 2) of the rack rod 13 within a housing 38, motion of the pinion 21 causes a force increasing mechanism within a steering gear box 39 to be actuated simultaneously, and the rack rod 13 is reciprocated in the right and left direction by increased steering force.

Figure 7:
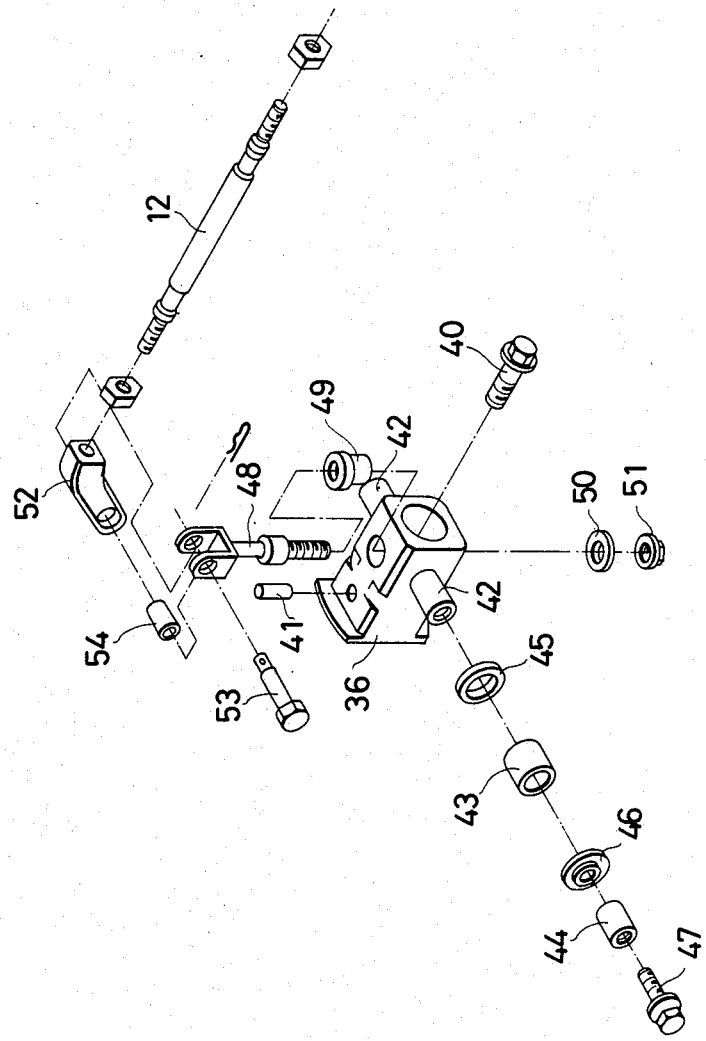
FIG. 7 is an exploded perspective view of a rack end and a tie rod.

FIG. 7 illustrates an exploded perspective view showing a detailed structure of a rack end 36. The rack end 36 is fixed to one end portion of the rack rod 13 by a bolt 40 and prohibited a relative rotation thereof by a pin 41. The rack end 36 is provided at both sides thereof with projection shafts 42 projecting therefrom. These projection shafts 42 are mounted with a roller 43 and a roller 44 by a bolt 47 through a collar 45 and a washer 46. The roller 43 constitutes the engaging piece 24 engaging in the elongated hole 25 of the lean control member 17. As shown in FIG. 4, the driven roller 43 is slidably engaged in the elongated hole 25. The roller 44 constitutes another engaging piece. The roller 44 is slidably engaged in the guide groove of the rail member 27. The rack end 36 is supported by the bracket 19 through the roller 44 and the rail member 27. Accordingly, a force which is transmitted from the suspension spring 14 to the rack end 36 through the lean control member 17 for bending the rack rod 13 is received by the vehicle body 2 through the bracket 19. Accordingly, the bending force is not acted on the rack rod 13. As a result, the rack rod 13 is smoothly reciprocated.

The rack end 36 is pivotably mounted on its upper surface with a tie rod mounting shaft 48 through a bush 49, a washer 50 and a bolt 51. The mounting shaft 48 is pivotably attached at its upper end with a rod end 52 of the tie rod 12 by a pin 53 and a bush 54. The other end of the tie rod 12 is connected to the knuckle arm 10 as described in the foregoing.

Figure 9:
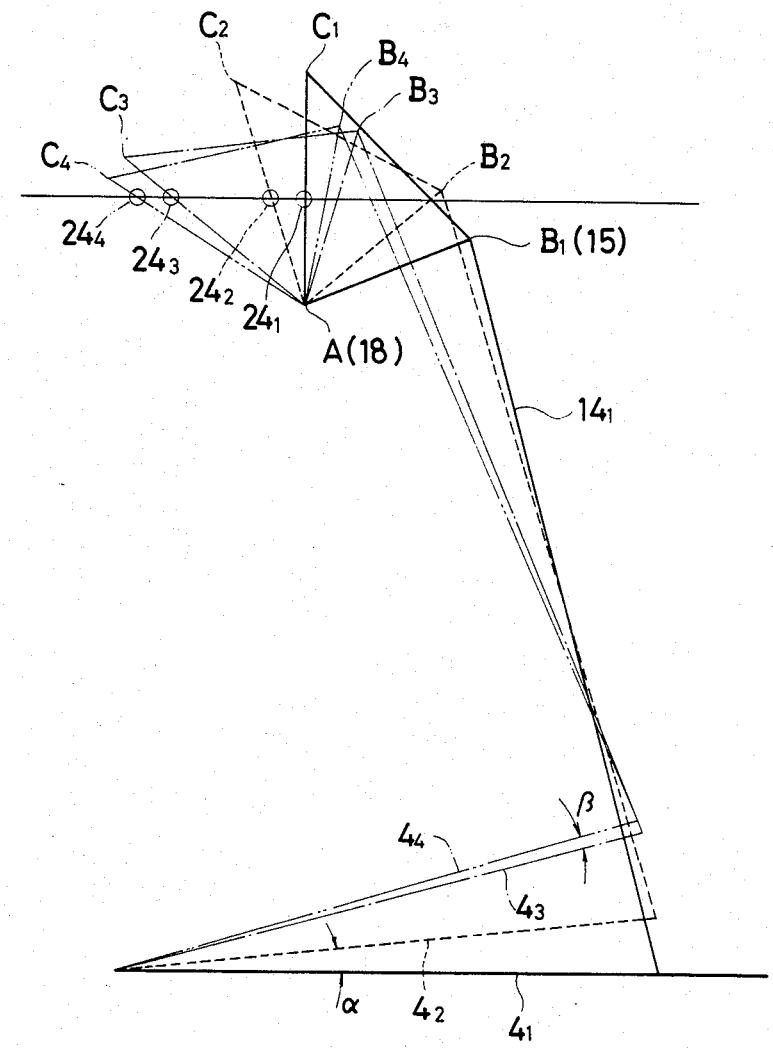
FIG. 9 is a chart showing operation characteristics of the present embodiment.
Figure 10:
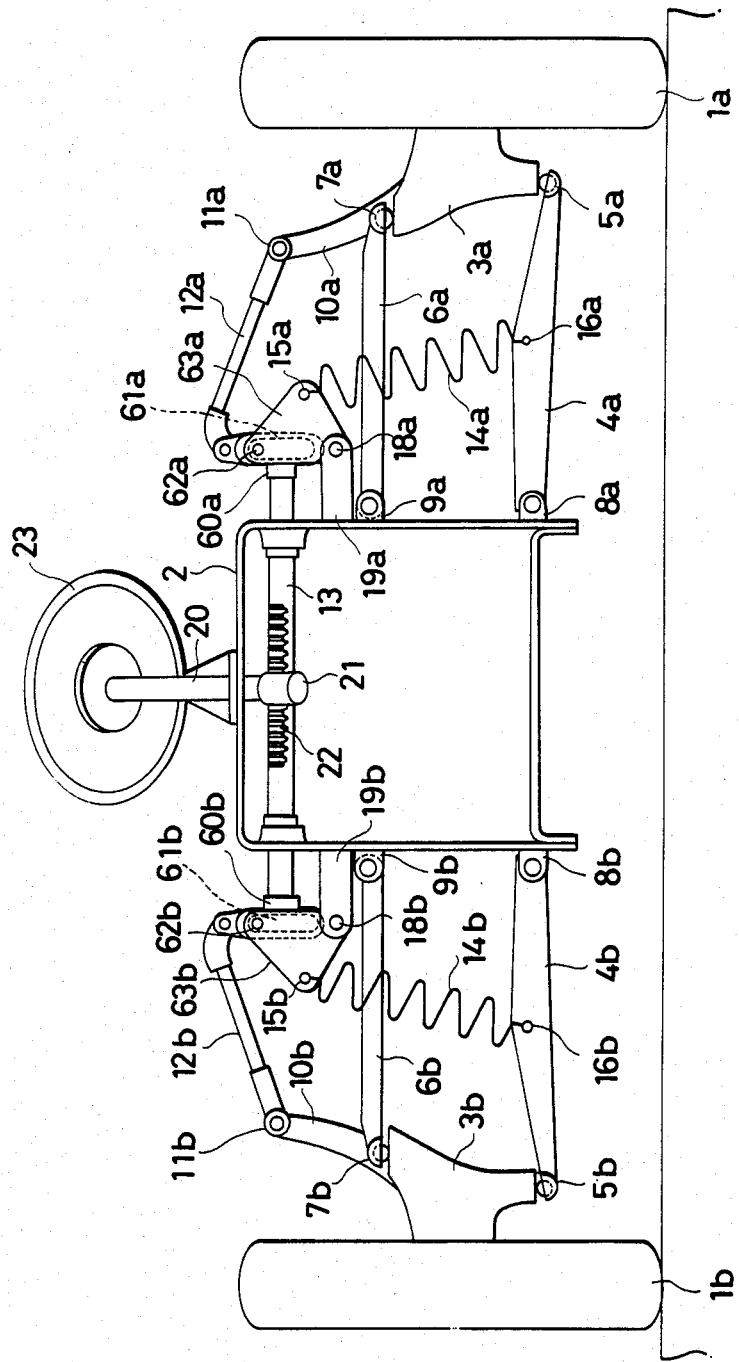
FIG. 10 is a front view of another embodiment of the present invention when running straight forward.

FIG. 9 is a chart showing operation characteristics of the above embodiment, in which the lean control member 17 is shown by a triangle ABC. A point A corresponds to the pivot shafts 18, while a point B corresponds to the pivot 15. And, AC corresponds to an axis of the elongated hole 25. The solid line denotes a lean control member $AB_1C_1$ in its neutral position, a suspension spring $14_1$ and a lower arm $4_1$. When an engaging member $24_1$ is moved from the foregoing state to a position shown by $24_2$ in order to effect a turn leftwardly, the lean control member becomes a triangle $AB_2C_2$ shown by a dotted line, and the lower arm is pulled up by an angle $\alpha$ as shown by a dotted line $4_2$. In the case the engaging piece 24 is moved by a distance equal to a distance between $24_1$ and $24_2$ at a position away from the neutral position, for example, when the engaging piece 24 is moved from $24_3$ to $24_4$, the lean control member 17 is changed from a state of the triangle $AB_3C_3$ shown by one dotted chain line to a state of the triangle $AB_4C_4$ shown by two dotted chain line, and swung by angle $C_3AC_4$. However, this swing angle $C_3AC_4$ is smaller than the swing angle $C_1AC_2$ in the vicinity of the neutral position. Similarly, a pull-up angle $\beta$ of the lower arm 4 corresponding to this is smaller than the afore-mentioned pull-up angle $\alpha$. That is, in this embodiment, the pull-up or push-down quantity of the lower arm with respect to a certain moving quantity of the steering member 13 is greatest when the steering member 13 is in its neutral position corresponding to a straight running state of a vehicle, and becomes smaller as the steering member 13 is moved leftwardly or rightwardly from the neutral position. Accordingly, the vehicle body is largely inclined when it starts turning, but thereafter, the body is not further inclined largely even if operation angle of the handle is increased.

However, this inclination characteristics can be changed by changing the mounting position 15 of the suspension spring with respect to the lean control member 17. It can be rendered with a progressing characteristics wherein the vehicle body inclination rate is small at first and large later. Further, it can also be rendered with a linear style characteristics wherein the vehicle body inclination rate is constant from the beginning to the end.

FIGS. 10 through 14 illustrate another embodiment of the present invention. FIGS. 10 through 13 are similar views as FIGS. 1 through 4, and therefore, like parts are denoted by like numeral throughout the figures. Accordingly, in the coming explanation of this embodiment, a duplicate description as that of the preceding embodiment is omitted.

In this embodiment, a rack end 60 fixed to an end portion of the steering member 13 is formed with an elongated hole 61 in the intersecting direction with respect to the axis of the steering member 13. And, a lean control member 63 pivotably attached to the bracket 19 fixedly mounted to the vehicle body 2 through the pivot shaft 18 is provided with an engaging piece 62 slidably engaged in the elongated hole 61. The rack end 60 is pivotably attached with the end portion of the tie rod 12. The lean control member 63 is mounted with the upper end of the suspension spring 14 through the pivot 15.

Figure 11:
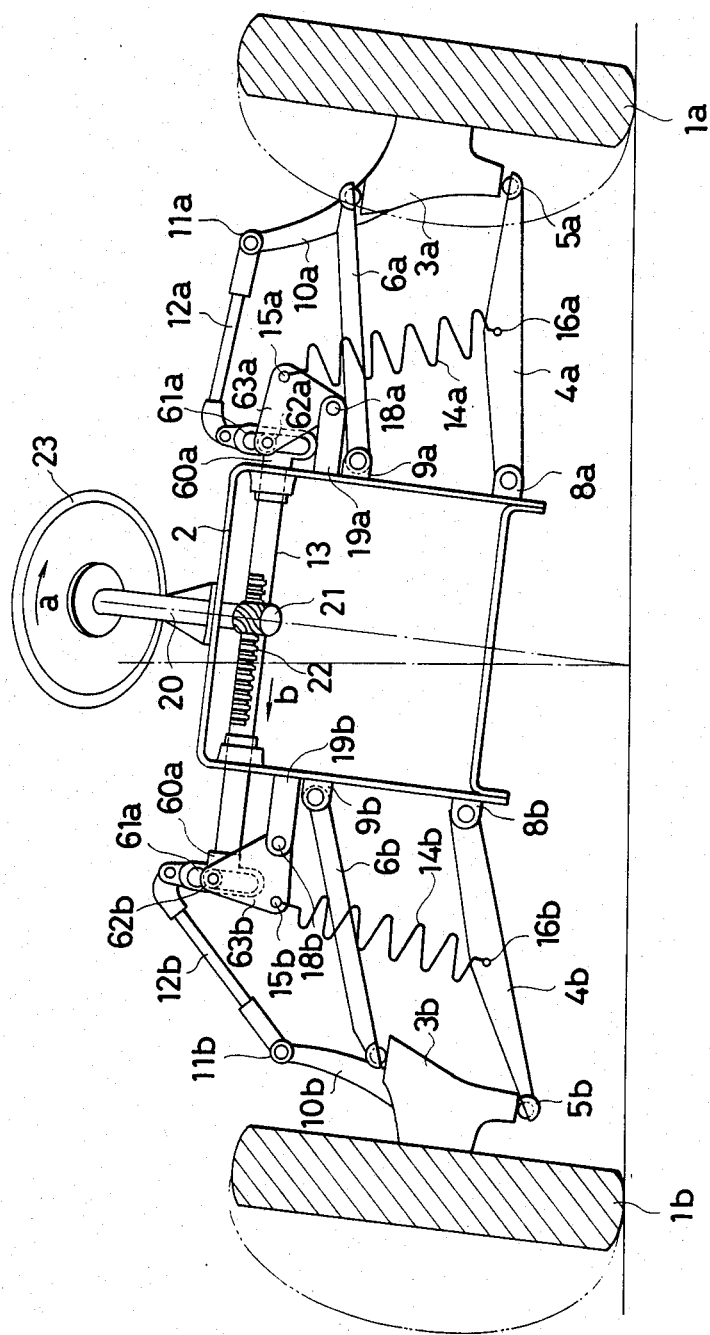
FIG. 11 is a front view of the above embodiment when effecting a turn.
Figure 12:
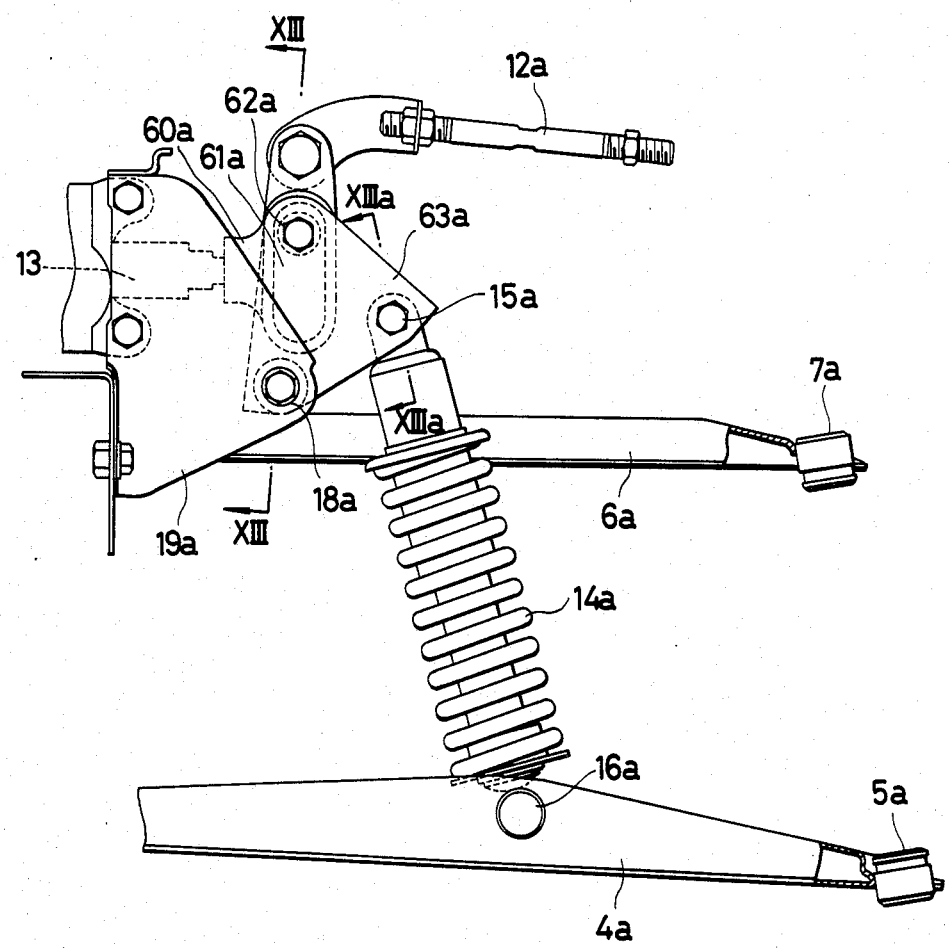
FIG. 12 is an enlarged view of FIG. 10 showing a part thereof in greater detail.

In this embodiment, when the steering wheel 23 is turned clockwise as shown by an arrow a in FIG. 11 in order to effect a left turn, due to the pivotal movement of the pinion 21, the steering member 13 is moved rightwardly as shown by an arrow b and a lean control member 63 engaged with the steering member 13 through the elongated hole 61 and the engaging piece 62 is pivoted about the pivot shaft 18 rightwardly.

Figure 13:
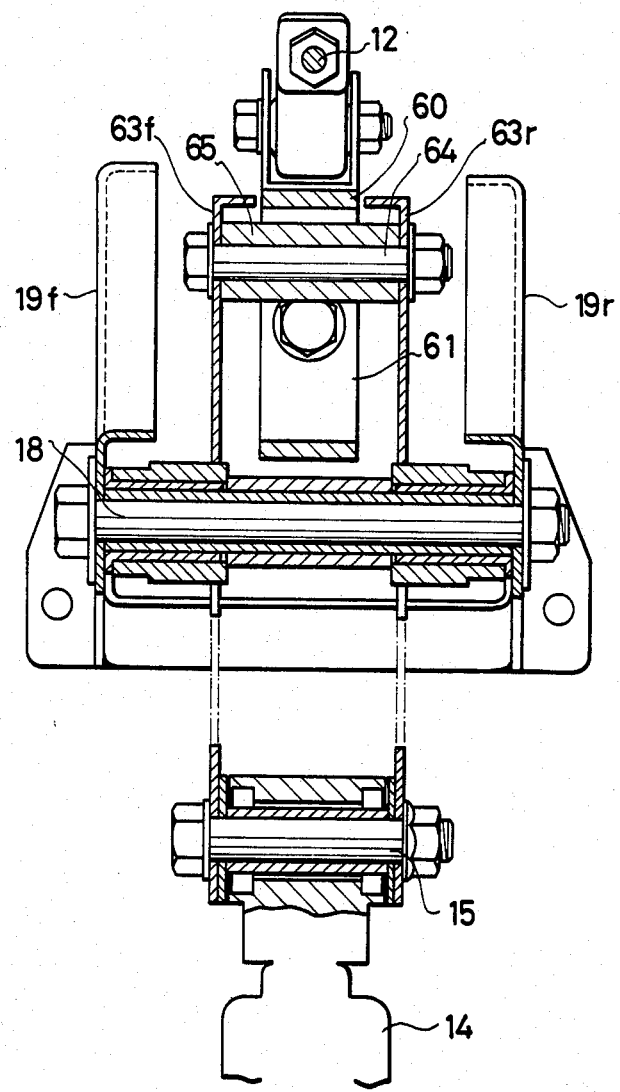
FIG. 13 is a sectional view taken on lines XIII—XIII and XIIIa—XIIIa of FIG. 12.

As shown in FIG. 13, the bracket 19 comprises two front and rear bracket pieces 19$f$ and 19$r$. Between the bracket pieces 19$f$ and 19$r$, the bolt 18 constituting the pivot shaft 18 is disposed. And, pivotably attached to the bolt 18 are two front and rear lean control members 63$f$ and 63$r$ for swinging. Between both the lean control members 63$f$ and 63$r$, the roller 65 is pivotably mounted through the bolt 64. The roller 65 corresponds to the engaging piece 62 in FIGS. 10 through 12 and is slidably engaged in the elongated hole 61 formed in the rack end 61. Further, between both the lean control members 63$f$ and 63$r$, the pivoting shaft 15 adapted to connect the suspension spring 14 to the lean control member 63 is also thrusted.

Figure 14:
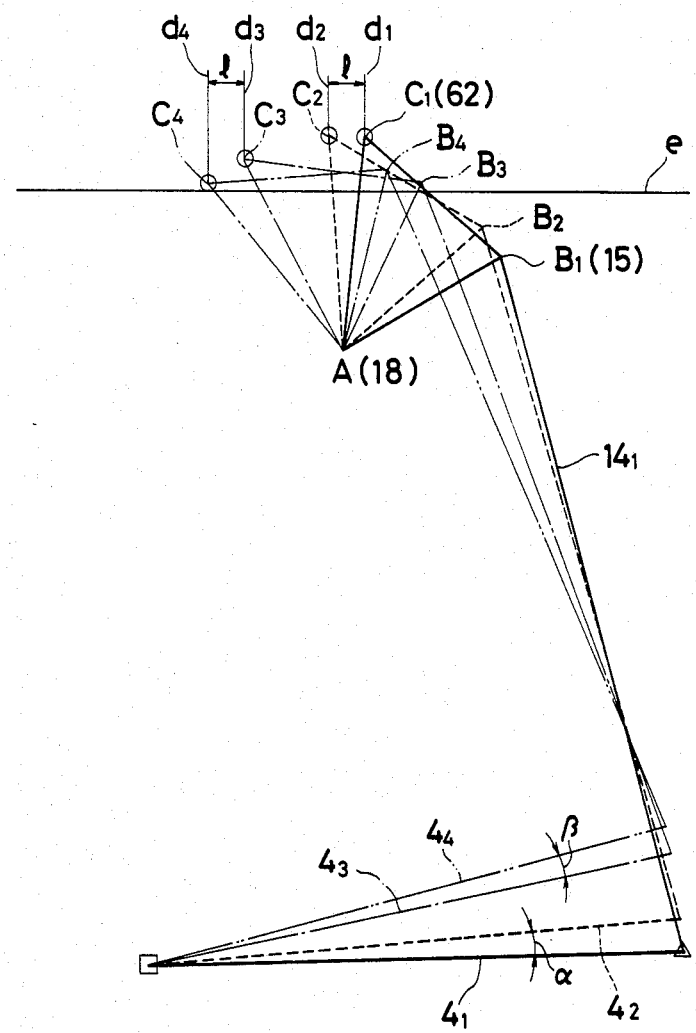
FIG. 14 is a chart showing an operation characteristics of the present invention.

Operation characteristics of this embodiment are shown in FIG. 14. In this chart same as in the case of FIG. 9, the lean control member 63 is shown by a triangle ABC. A point A corresponds to the pivot shaft 18, a point B corresponds to the pivot 15, and a point C corresponds to the engaging piece 62. The solid line denotes the lean control member $AB_1C_1$ in its neutral position, suspension spring $14_1$ and lower arm $4_1$. When a center line $d_1$ of the elongated hole 61 is moved by l from the foregoing state to a position shown by $d_2$ in order to effect a turn leftwardly, the lean control member becomes a triangle $AB_2C_2$ as shown by a dotted line, and the lower arm is pulled up by an angle as shown by a dotted line $4_2$. In the case the center line is moved by an equal distance l, for example, from $d_3$ to $d_4$ at a position away from the neutral position, the lean control member 63 is changed from a state of the triangle $AB_3C_3$ as shown by one dotted chain line to a state of the triangle $AB_4C_4$ as shown by two dotted chain line, and swung by angle $C_3AC_4$. Although this swing angle $C_3AC_4$ is larger than the swing angle $C_1AC_2$ in the vicinity of the neutral position, due to positional relation of the pivot 15 with respect to the pivot shaft 18 and the engaging piece 62, a pull-up angle $\beta$ of the lower arm 4 becomes almost same as the pull-up angle $\alpha$. That is, this embodiment has an inclination characteristic of a linear style wherein the inclination rate of the vehicle body with respect to a certain moving quantity of the steering member 13 is almost constant from the begining to the end. However, this inclination characteristic can be changed by changing the mounting position 15, i.e., the position of the pivot 15 of the suspension spring with respect to the lean control member 63. It can be rendered with a progressing characteristics wherein the vehicle body inclination rate is small at first and gradually becomes larger as the steering angle becomes larger. On the contrary, it can be rendered with a reverse characteristic.

Although the present invention has been described by way of preferred embodiments, the present invention is not limited to the above embodiments. Instead, many other modifications can be made without departing from the spirit of the present invention. For example, the suspension spring may be mounted between the lean control member and the upper arm. Also, the present invention may be applied to a vehicle body having a suspension mechanism of other types than wishbone.

What is claimed is:

1. A vehicle body inclining apparatus of a vehicle for inclining the vehicle body toward the turning center side during turning including:

a steering member for reciprocating in the right and left directions;

a tie rod connected to said steering member;

a lean control member mounted on said vehicle body for swinging in the right and left directions;

means for connecting said steering member to said lean control member including an elongated hole formed in one of said members and an engaging piece on the other of said members engaged in said elongated hole so as to be swing said lean control member according to the reciprocation of said steering member; and a suspension spring mounted to said lean control member.

2. A vehicle body inclining apparatus according to claim 1, wherein said engaging piece is provided on said steering member and is slidably engaged in said elongated hole formed in said lean control member in the radial direction.

3. A vehicle body inclining apparatus according to claim 1, wherein said steering member is formed with said elongated hole in the direction intersecting the axis thereof, and said elongated hole is slidably engaged with said engaging piece provided on said lean control member.

4. A vehicle body inclining apparatus according to claim 1, wherein a bracket for pivotably supporting said lean control member is fixed to the vehicle body along said steering member, said bracket is provided with a rail member parallel to said steering member, and said rail member has defined therein said elongated hole which is slidably engaged with said engaging member provided at one end of said steering member.

* * * * *